(12) United States Patent
Devitt et al.

(10) Patent No.: US 11,869,218 B2
(45) Date of Patent: *Jan. 9, 2024

(54) SYSTEM AND METHOD FOR CAMERA CALIBRATION

(71) Applicant: Compound Eye, Inc., Redwood City, CA (US)

(72) Inventors: Jason Devitt, Redwood City, CA (US); Haoyang Wang, Redwood City, CA (US); Harold Wadleigh, Redwood City, CA (US); Zachary Flom, Redwood City, CA (US)

(73) Assignee: Compound Eye, Inc., Redwood City, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/586,475

(22) Filed: Jan. 27, 2022

(65) Prior Publication Data

US 2022/0148226 A1 May 12, 2022

Related U.S. Application Data

(63) Continuation of application No. 17/154,986, filed on Jan. 21, 2021, now Pat. No. 11,270,467.

(60) Provisional application No. 62/963,902, filed on Jan. 21, 2020.

(51) Int. Cl.
*G06T 7/80* (2017.01)
*G06T 7/50* (2017.01)
*G06T 1/00* (2006.01)

(52) U.S. Cl.
CPC .............. *G06T 7/85* (2017.01); *G06T 1/0007* (2013.01); *G06T 7/50* (2017.01); *G06T 2207/10012* (2013.01)

(58) Field of Classification Search
None
See application file for complete search history.

(56) References Cited

U.S. PATENT DOCUMENTS

| | | |
|---|---|---|
| 5,692,063 A | 11/1997 | Lee et al. |
| 5,875,264 A | 2/1999 | Carlstrom |
| 8,036,494 B2 | 10/2011 | Chen |
| 8,644,620 B1 | 2/2014 | Lam |
| 9,123,118 B2 * | 9/2015 | Ciurea ............... G02B 27/0075 |
| 9,338,439 B2 * | 5/2016 | Grossmann .......... H04N 13/246 |
| 9,704,250 B1 | 7/2017 | Shah et al. |
| 10,339,631 B2 * | 7/2019 | Price .................... H04N 23/843 |
| 10,528,844 B2 | 1/2020 | Sugimura et al. |
| 10,762,655 B1 | 9/2020 | Lindskog et al. |

(Continued)

OTHER PUBLICATIONS

Written search opinion for WIPO PCT/US21/14459 WIPO publication WO2021150784, dated Jun. 15, 2017, Available online at https://patentscope.wipo.int/search/en/detail.jsf?docId=WO2017098013&_cid=P11-LIG79Z-28429-1 (Year: 2017).*

(Continued)

*Primary Examiner* — Tahmina N Ansari
(74) *Attorney, Agent, or Firm* — Jeffrey Schox; Diana Lin (57) ABSTRACT

A system and/or method for imaging system calibration, including: determining a dense correspondence map matching features in a first image to features in a second image, and determining updated calibration parameters associated with the image acquisition system based on the matching features.

20 Claims, 6 Drawing Sheets

(56) References Cited

U.S. PATENT DOCUMENTS

| | | |
|---|---|---|
| 10,764,561 B1 | 9/2020 | Devitt |
| 2002/0097912 A1 | 7/2002 | Kimmel et al. |
| 2004/0095999 A1 | 5/2004 | Piehl et al. |
| 2004/0240725 A1 | 12/2004 | Xu et al. |
| 2005/0140670 A1 | 6/2005 | Wu et al. |
| 2005/0275660 A1 | 12/2005 | Keller |
| 2007/0121998 A1 | 5/2007 | Stein |
| 2007/0146232 A1 | 6/2007 | Redert et al. |
| 2007/0229528 A1 | 10/2007 | Keller |
| 2008/0273751 A1 | 11/2008 | Yuan et al. |
| 2009/0037491 A1 | 2/2009 | Cachin et al. |
| 2010/0295926 A1 | 11/2010 | Estrada et al. |
| 2011/0206236 A1 | 8/2011 | Center |
| 2011/0273582 A1 | 11/2011 | Gayko et al. |
| 2012/0050488 A1 | 3/2012 | Cohen et al. |
| 2012/0250984 A1 | 10/2012 | Taylor |
| 2012/0306847 A1 | 12/2012 | Lim et al. |
| 2013/0266078 A1 | 10/2013 | Deligiannis et al. |
| 2014/0105499 A1 | 4/2014 | Shechtman et al. |
| 2014/0112572 A1 | 4/2014 | Reif et al. |
| 2014/0160247 A1 | 6/2014 | Shi et al. |
| 2015/0042766 A1* | 2/2015 | Ciurea ............... G06T 7/557 348/48 |
| 2015/0348273 A1 | 12/2015 | Chapiro et al. |
| 2016/0093056 A1 | 3/2016 | Ouzounis |
| 2016/0196654 A1 | 7/2016 | Aoki et al. |
| 2016/0267672 A1* | 9/2016 | Ciurea ............. H04N 13/232 |
| 2017/0161912 A1 | 6/2017 | Yoo et al. |
| 2017/0287169 A1 | 10/2017 | Garcia |
| 2017/0327127 A1 | 11/2017 | Simon |
| 2017/0343356 A1 | 11/2017 | Roumeliotis et al. |
| 2018/0018805 A1 | 1/2018 | Kutliroff et al. |
| 2018/0352213 A1 | 12/2018 | Valentin et al. |
| 2019/0007673 A1 | 1/2019 | Karvounis |
| 2019/0065868 A1 | 2/2019 | Tran et al. |
| 2019/0164040 A1 | 5/2019 | Naroditsky et al. |
| 2019/0180514 A1 | 6/2019 | Sasaki |
| 2019/0279387 A1 | 9/2019 | Liu et al. |
| 2019/0311485 A1 | 10/2019 | Buczko et al. |
| 2020/0084427 A1 | 3/2020 | Sun et al. |
| 2020/0349846 A1* | 11/2020 | Siboni .............. H04N 13/128 |
| 2021/0021802 A1 | 1/2021 | Devitt |
| 2021/0065379 A1 | 3/2021 | Zhang et al. |
| 2021/0073953 A1 | 3/2021 | Lee |
| 2021/0225035 A1* | 7/2021 | Devitt ............... G06T 1/0007 |

OTHER PUBLICATIONS

"Low-discrepancy sequence", https://en.wikipedia.org/wiki/Low-discrepancy_sequence.

"Stereo Visual Odometry", Viulib-Vicomtech Solutions, https://www.viulib.org/solutions/s5/stereo_visual_odometry.

Banz, C., et al., "Evaluation of Penalty Functions for Semi-Global Matching Cost Aggregation", Int. Arch. Photogramm. Remote Sens. Spatial Inf. Sci. 2012.

Banz, C., et al., "Real-time stereo vision system using semi-global matching disparity estimation: Architecture and FPGA-implementation", in 2010 International Conference on Embedded Computer Systems: (IEEE, 2010).

Baraldi, Patrizia, et al., "Motion and Depth from Optical Flow", AVC 1989 doi:10.5244/C.3.35.

Barron, J.L., et al., "Performance of Optical Flow Techniques", IJCV 12:1, pp. 43-77, 1994.

Beall, Chris, "Stereo Visual Odometry", CVPR 2014 Visual SLAM Tutorial, Georgia Tech, Institute for Robotics and Intelligent Machines.

Bleyer, M., et al., "PatchMatch Stereo—Stereo Matching with Slanted Support Windows", in Proceedings of the British Machine Vision Conference 2011 14.1-14.11 (British Machine Vision Association, 2011). doi:10.5244/C.25.14.

Bleyer, Michael, et al., "Stereo Matching-State-of-the-Art and Research Challenges", In book: Advanced Topics In Computer Vision (pp. 143-179) Publisher: Springer, Jan. 2013.

Boukamcha, Hamdi, et al., "Robust auto calibration technique for stereo camera", International Conference on Engineering & Mis (ICEMIS), Monastir, Tunisia, 2017, pp. 1-6, doi: 10.1109/ICEMIS.2017.8272992, https://ieeexplore.ieee.org/document/8272992.

Chang, J.R., et al., "Pyramid Stereo Matching Network", arXiv:1803.08669 [cs] (2018).

Cormack, Lawrence K., et al., "Binocular Mechanisms of 3D Motion Processing", https://www.ncbi.nlm.nih.gov/bmc/articles/PMC5956901/.

Cvisic, Igor, et al., "Stereo odeemetry based on careful feature selection and tracking", IEEE 2015, www.cvlibs.net/datasets/kitti/eval_odometry.php.

Dang, Thao, et al., "Continuous Stereo Self Calibration by Camera Parameter Tracking", IEEE Transactions on Image Processing, vol. 18, No. 7, Jul. 2009.

Distler, Jonathan, "How to Know if Stereo Camera Lose Calibration", https://www.foresightauto.com/how-to-know-if-stereo-cameras-lose-calibration/, Aug. 27, 2020.

Fucek, Luka, et al., "Dense Disparity Estimation in Ego-motion Reduced Search Space", Computer Science, Engineering, ArXiv, published 2017, https://arxiv.org/pdf/1708.06301.pdf.

Geiger, A., et al., "Efficient Large-Scale Stereo Matching. in Computer Vision", ACCV 2010 (eds. Kimmel, R., Klette, R. & Sugimoto, A.) vol. 6492 25-38 (Springer Berlin Heidelberg, 2011).

Godard, C., et al., "Unsupervised Monocular Depth Estimation with Left-Right Consistency", arXiv:1609.03677 [cs, stat] (2017).

Hatzitheodorou, M., et al., "Stereo Matching Using Optic Flow", American College of Greece, 2000, Academic press, 16 pages.

Hemayed, Elsayed E., et al., "A Survey of Camera Self-Calibration", Proceedings of the IEEE Conference on Advanced Video and Signal Based Surveillance, 2003.

Hirschmuller, H., "Stereo Processing by Semiglobal Matching and Mutual Information", IEEE Trans. Pattern Anal. Mach. Intell. 30, 328-341 (2008).

Hisiung, Jerry, et al., "Information Sparsification in Visual-Inertial Odometry", Conference Paper, Proceedings of (IROS) IEEE/RSJ International Conference on Intelligent Robots and Systems, pp. 1146-1153, Oct. 2018.

Jonschkowski, Rico, et al., "What Matters in Unsupervised Optical Flow", arXiv:2006.04902v2 [cs.CV] Aug. 14, 2020.

Kendall, Alex, et al., "End-to-End Learning of Geometry and Context for Deep Stereo Regression", arXiv: 1703.04309v1 [cs.CV] Mar. 13, 2017.

Knoblauch, Daniel, et al., "Factorization of Correspondence and Camera Error for Unconstrained Dense Correspondence Applications", UC Davis, IDAV Publications, 2009.

Laga, H., et al., "A Survey onDeep Learning Techniques for Stereo-based Depth Estimation", arXiv:2006.02535 [cs] (2020).

Lai, Hsueh-Ying, et al., "Bridging Stereo Matching and Optical Flow via Spatiotemporal Correspondence", 2019 IEEE/CVF Conference on Computer Vision and Pattern Recognition (CVPR), Jun. 15-20, 2019, https://ieeexplore.IEEE.org/document/8953227.

Lee, D.J., et al., "Hardware Implementation of a Spline-Based Genetic Algorithm for Embedded Stereo Vision Sensor Providing Real-Time Visual Guidance to the Visually Impaired", EURASIP J. Adv. Signal Process. 2008.

Marr, D., et al., "Cooperative Computation of Stereo Disparity", Science 194, 283-287 (1976).

Mentzer, Nico, et al., "Self-Calibration of Wide Baseline Stereo Camera System for Automative Applications", In book: Towards a Common Software/Hardware Methodology for Future Advanced Driver Assistance Systems. The DESERVE Approach (pp. 157-200)Chapter: Self-Calibration of Wide Baseline Stereo Camera Systems for Automotive ApplicationsPublisher: River Publisher.

Mourikis, Anastasios I., et al., "A Multi-State Constraint Kalman Filter for Vision-aided Inertial Navigation", Proceedings 2007 IEEE International Conference on Robotics and Automation, Apr. 10-14, 2007, https://www-users.cs.umn.edu/~stergios/papers/ICRA07-MSCKF.pdf.

Muhovic, Jon, et al., "Correcting Decalibration of Stereo Cameras in Self-Driving Vehicles", Sensors 2020, 20,3241; doi: 10.3390/s20113241, ww.mdpi.com/journal/sensors.

(56) References Cited

OTHER PUBLICATIONS

Nie, Y., et al., "Adaptive rood pattern search for fast block-matching motion estimation", IEEE Transactions on Image Processing (2002).

Ozuysal, Mustafa, "Manual and Auto Calibration of Stereo Camera Systems", Thesis submitted to the Graduate School of Natural and Applied Sciences of Middle East Technical University, Aug. 2004.

Park, Jinsun, et al., "Non-Local Spatial Propagation Network for Depth Completion", arXiv:2007.10042v1 [cs.CV] Jul. 20, 2020.

Poddar, Shashi, et al., "Evolution of Visual Odometry Techniques", ARXIV (ID: 1804.11142), Apr. 30, 2018 (Year: 2018).

Psarakis, E.Z., "An enhanced correlation-based method for stereo correspondence with subpixel accuracy", in Tenth IEEE International Conference on Computer Vision, vol. 1, pp. 907-912.

Rabe, Clemens, et al., "Fast detection of moving objects in complex scenarios", Proc. IEEE Symp. Intelligent Vehicles, Jun. 2007, (Year: 2007).

Rahnama, O., et al., "Real-Time Dense Stereo Matching With ELAS on FPGA Accelerated Embedded Devices", IEEE Robot. Autom. Lett. 3, 2008-2015 (2018).

Roberts, Richard, et al., "Learning general optical flow subspaces for egomotion estimation and detection of motion anomalies", IEEE Conference on Computer Vision and Pattern Recognition, Jun. 20-25, 2009, (Year: 2009).

Rong, G., et al., "Variants of Jump Flooding Algorithm for Computing Discrete Voronoi Diagrams", in Proceedings of the 4th International Symposium on Voronoi Diagrams in Science and Engineering 176-181 (IEEE Computer Society, 2007).

Rossi, M., et al., "Joint Graph-Based Depth Refinement and Normal Estimation", in 2020 IEEE/CVF Conference on Computer Vision and Pattern Recognition 12151-12160 (IEEE, 2020).

Scaramuzza, Davide, "Visual Odometry [Tutorial]", IEEE Robotics & Automation Magazine, vol. 18, Is. 4, Dec. 2011) (Year: 2011).

Scaramuzza, Davide, et al., "Visual-Inertial Odometry of Aerial Robots", Springer Encyclopedia of Robotics, 2019.

Scharstein, D., "A taxonomy and evaluation of dense two-frame stereo correspondence algorithms", in Proceedings IEEE Workshop on Stereo and Multi-Baseline Vision (SMBV 2001) 131-140 (IEEE Comput. Soc, 2001).

Sivaraj, Hemanthkumar, et al., "Random Walk Based Heuristic Algorithms for Distributed Memory Model Checking", Electronic Notes in Theoretical Computer Science 89, No. 1 (2003) 17 pages URL: http://elsevier.nl/locate/entcs/volume89.html, Year: 2003).

Straub, J., et al., "Fast Relocation for Visual Odometry Using Binary Features", IEEE International Conference on Image Processing (ICIP), Sep. 2013, https://www.researchgate.net/publication/237048601_Fast_Relocalization_For_Visual_Odometry_Using_Binary_Features.

Sun, D., et al., A Quantitative Analysis of Current Practices in Optical Flow Estimation and the Principles Behind Them, Int J Comput Vis 106, 115-137 (2014).

Talukder, Ashit, et al., "Real-time detection of moving objects from moving vehicles using dense stereo and optical flow", IEEE/RSJ International Conference on Intelligent Robots and Systems, Sep. 28- Oct. 2, 2004, (Year: 2004).

Tatsumi, S., et al., "An FPGA accelerator for PatchMatch multi-view stereo using OpenCL", J Real-Time Image Proc 17, 215-227 (2020).

Usenko, Vladyslav, et al., "Direct Visual-Inertial Odometry with Stereo Cameras", 2016 IEEE International Conference on Robotics and Automation (ICRA), May 16-21, 2016, https://ieeexplore.ieee.org/document/7487335.

Zabih, R., et al., "Non-parametric Local Transforms for Computing Visual Correspondence.", in ECCV (1994).

Zhang, Tianguang, et al., "Visual odometry for the Autonomous City Explorer", IEEE/RSJ International Conference on Intelligent Robots and Systems, Oct. 10-15, 2009, (Year: 2009).

Zhuang, Hanqi, et al., "A self-calibration approach to extrinsic parameter estimation of stereo cameras", Robotics and Autonomous Systems 15 (1995) 189-197.

\* cited by examiner

SYSTEM AND METHOD FOR CAMERA CALIBRATION

CROSS-REFERENCE TO RELATED APPLICATIONS

This application is a continuation of U.S. application Ser. No. 17/154,986, filed 21 Jan. 2021, which claims the benefit of U.S. Provisional Application No. 62/963,902, filed 21 Jan. 2020, both of which are incorporated in their entirety by this reference.

TECHNICAL FIELD

This invention relates generally to the imaging field, and more specifically to a new and useful system and method in the imaging field.

BACKGROUND

Traditional imaging systems (e.g., stereo camera pairs) are calibrated at dedicated calibration facilities. Any changes to the imaging system arrangement (e.g., changes in alignment between two or more cameras or changes in the orientation of a single camera with respect to the host system) that occurs during use requires the system to return to the calibration facility for imaging system recalibration. To mitigate the risk of camera alignment changes during operation (e.g., resulting from vibrations, temperature changes, shock, mechanical events, humidity changes, etc.), the imaging system is typically mounted in a heavy, rigid housing (e.g., with small baselines or separations). Both the factory recalibration and the cumbersome mounting requirement create barriers to widespread commercial imaging system adoption. Thus, there is a need in the imaging field to create new and useful system and method for calibration. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
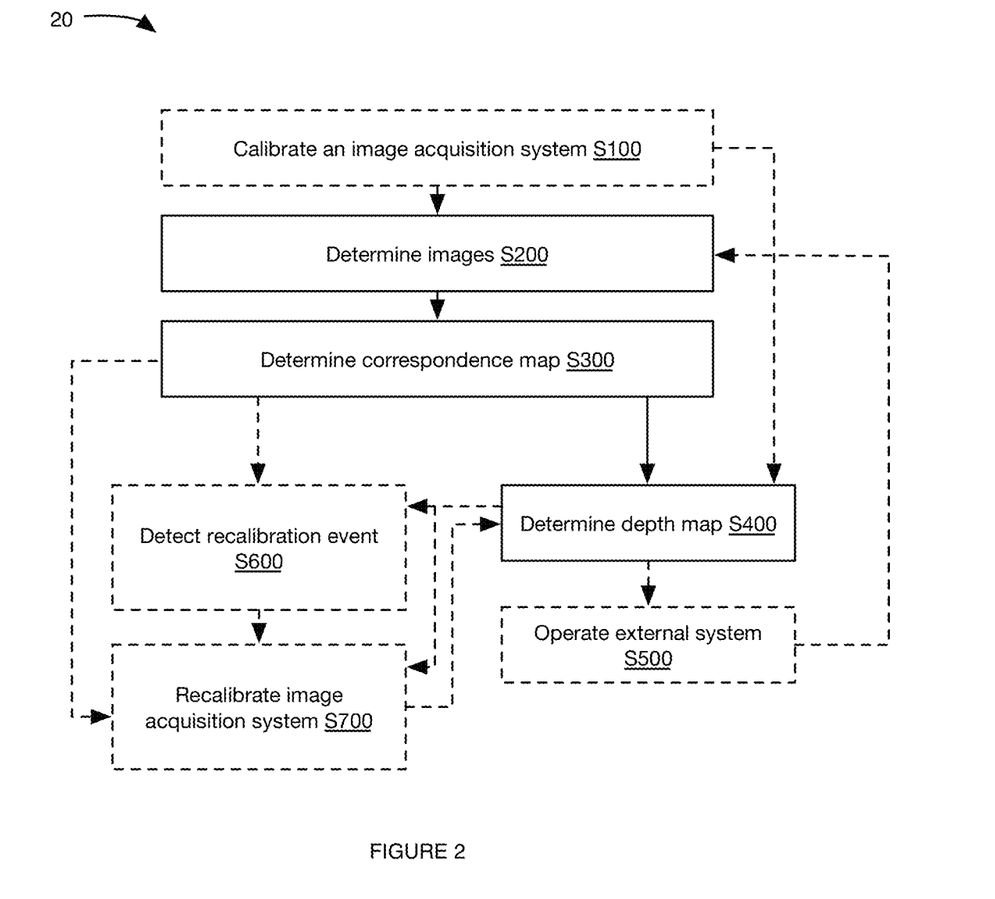
FIG. 2 is a schematic representation of the method.

As shown in FIG. 2, the method can include acquiring images S200, determining a correspondence map S300, and determining a depth map S400. The method can optionally include calibrating an image acquisition system S100, operating an external system S500, detecting a recalibration event S600, and recalibrating the image acquisition system S700.

Figure 1:
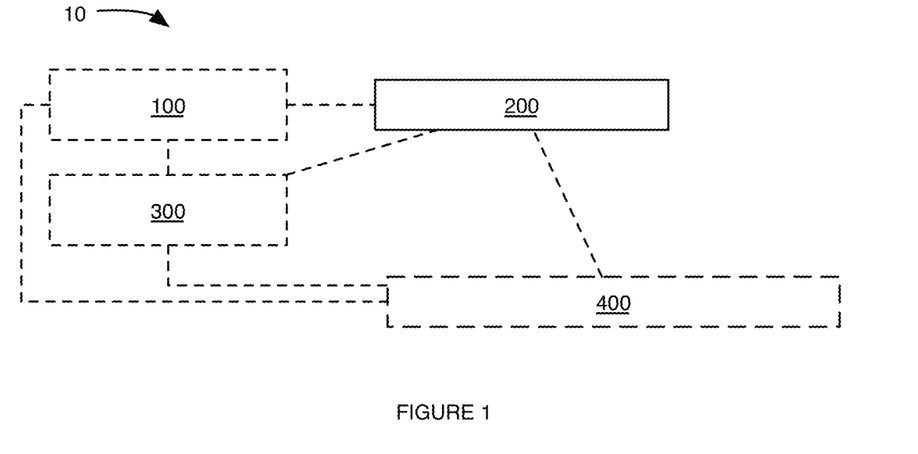
FIG. 1 is a schematic representation of the system.

As shown in FIG. 1, the system 10 can include a computing system 200. The system can optionally include an image acquisition system 100, one or more sensors 300, an external system 400, and/or any components.

The system 10 and method 20 preferably function to provide a reliably calibrated sensing system configured to produce a substantially accurate depth map. The calibration, correspondence map, and/or depth map can be used to: generate operation instructions for an external system, calibrate auxiliary sensors (e.g., using the determined depth for a common feature found in both the system 10's and auxiliary sensor measurements), and/or otherwise used.

2. Benefits.

Variations of the technology can confer several benefits and/or advantages.

First, variants of the technology can search for feature correspondences off the expected epipolar line (e.g., horizontal scanline in stereo rectified images) enabling inaccurate calibration (also referred to as incorrect calibration or miscalibration) and/or miscalibration events to be detected and flagged, while still enabling depth maps to be generated (e.g., for operation of an external system).

Second, variants of the technology can calibrate the imaging system using feature correspondences from the correspondence map. This can be performed with or without a calibration target, and can be performed online (e.g., during operation, during imaging system traversal through an unstructured or uncontrolled environment, etc.) or at the factory (e.g., in a controlled environment).

Third, variants of the technology can identify features, match features, and/or otherwise determine dense correspondence maps, which can include correspondences between nondistinct features (e.g., in largely featureless scenes). These dense correspondence maps can be used for dense depth map determination even when the correspondence map includes some false correspondences (e.g., wherein the method can be robust to false correspondence inclusion) and/or online calibration.

However, variants of the technology can confer any other suitable benefits and/or advantages.

3. System.

As shown in FIG. 1, the system 10 can include a computing system 200. The system can optionally include an image acquisition system 100, one or more sensors 300, an external system 400, and/or any components.

The image acquisition system 100 preferably functions to acquire images. The images can be still images, a timeseries of images, frames of one or more videos, and/or any suitable image(s). The images can be monocular images, image pairs, image triplets, image quartets, image quintets, image sextets, image octets, and/or any number of images. Different images preferably capture different perspectives of the same scene (e.g., taken from different horizontal perspectives, taken from different vertical perspectives, taken at different times, etc.), but can capture the same perspective of the scene (e.g., using different imaging modalities, different imaging wavelengths, etc.).

The image acquisition system is preferably coupled to the computing system 200. However, additionally or alternatively, the computing system can be integrated into the image acquisition system, the image acquisition system can be in communication with the computing system (e.g., via a wired or wireless connection), and/or the image acquisition system and computing system can be otherwise connected or disconnected. Each image acquisition system can be associated with one or more computing systems. Each computing system can be associated with one or more image acquisition systems.

The image acquisition system can include one or more cameras. The image acquisition system preferably includes two or more cameras (e.g., 3, 5, 10, 30, etc.); however, additionally or alternatively, the image acquisition system can include a single camera (e.g., configured to capture video, configured with variable apertures, configured to capture images of distinct portions of a scene on the camera sensor, configured to capture images from different positions, etc.). The cameras can be digital cameras, SLR cameras, thermal cameras, optical cameras, infrared cameras, low light cameras, x-ray detectors, ultraviolet cameras, global shutter cameras, rolling shutter cameras, event cameras, neuromorphic imagers, and/or any suitable camera technology.

The camera(s) can be statically mounted relative to each other (e.g., by a rigid rail, rack, shared housing, external system housing, etc.), semi-rigidly mounted (e.g., fixed such that during normal operation they reorient and/or move by less than 1°, 2°, 5°, 10°, etc. pixel dimensions such as length and/or width), rigidly mounted (e.g., during normal operation, the camera and/or sensor elements of the camera move by less than 1 pixel dimension), flexibly mounted relative to each other (e.g., via an external system housing, by actuation mechanisms, etc.) loosely mounted, actuatably mounted (e.g., mounted to a movable arm or a track), unmounted (e.g., freehand), and/or mounted in any suitable manner. The cameras are preferably mounted to each other (e.g., via an intermediary housing, mounting substrate, bar, etc.), but can alternatively be mounted to a common mounting surface (e.g., an external system), or other surface.

The separation between the camera(s) (e.g., between two cameras, between images captured with one camera wherein the camera has moved between the image acquisition, "baseline", etc.) is preferably known; however, the separation can be unknown (e.g., in variants configured to determine odometry). The baseline is preferably at least a minimum distance (e.g., 10 cm, 50 cm, 1 m, 5 m, etc.). However, the cameras can alternatively be arranged within a predetermined distance and/or otherwise be arranged. The cameras can be arranged along a common horizontal reference (e.g., image sensors for each camera are aligned to the same horizontal reference line), a common vertical reference, arranged in a grid, and/or be otherwise arranged.

The image acquisition system preferably operates based on calibration parameters (extrinsic and intrinsic parameters). The extrinsic parameters preferably function to define the relationship between the cameras (and/or in variants including a single camera the relationship between the image acquisition settings for different applications of the single camera). The extrinsic parameters can include: the relative position of the cameras (e.g., x/y/z), the relative orientations of the cameras (e.g., θ/Ψ/φ, pitch/yaw/roll), the orientation of the image acquisition system relative to the external system, synchronization of the cameras (e.g., the relative exposure times, the relative shutter speed, the relative readout times, clock synchronization, etc.), and/or any suitable parameters. The intrinsic parameters preferably function to define the camera parameters that are fixed to each camera. Each camera is preferably associated with a set of intrinsic parameters. The intrinsic parameters can include: pixel size (e.g., lateral extent, longitudinal extent), pixel aspect ratio, skew coefficient, focal length, principal point, image sensor format (e.g., size, shape, etc. of the image sensor), depth of field, focal length, gain, maximum frame rate, and/or any suitable parameters. The extrinsic and intrinsic parameters are preferably stored as matrices (e.g., rotation matrix, translation matrix, camera matrix, etc.), but can be stored as parameters (e.g., fit parameters such as used to determine the matrix element values), in a look-up table (e.g., a factory specification sheet), and/or in any suitable format. For example, the extrinsic and intrinsic parameters can be stored as an essential matrix (e.g., a calibrated matrix including relative rotation and direction of translation), a fundamental matrix (e.g., an uncalibrated matrix including two parameters for the epipole of each camera and three parameters for the homography between the pencils of the epipolar line), as a set of calibration parameters, and/or otherwise be stored. The fundamental matrix is preferably related to the essential matrix by the intrinsic parameters of each camera, but can be otherwise related to the essential matrix.

Adjacent cameras preferably have overlapping fields of view (e.g., such that the cameras can capture overlapping features), but can have any other suitable field of view. In specific examples, the separation distance is preferably chosen such that the pairwise images overlap by at least ¼ of the images' view; however, the two or more images or captured frames can be otherwise related. The field of view for the image acquisition system is preferably between about 180° and 360°, but can be less than 180°. The field of view for each camera is preferably at least about 100° (e.g., 100°, 120°, 150°, 180°, 200°, 210°, 235°, 250°, 270°, 300°, 330°, 360°, values therebetween), but can be less than 100°. The field of view can refer to the horizontal field of view, vertical field of view, diagonal field of view, and/or any suitable field of view. Each camera can have the same field of view or a different field of view. In a first illustrative example, each camera can have an approximately 360° field of view. In a second illustrative example, one camera of the image acquisition system can have an approximately 360° field of view and the remaining camera(s) can have a field of view that is less than 360°. In a third illustrative example, an image acquisition system can include at least four cameras, each camera having a field of view that is approximately 100° (e.g., ±1°, ±5°, ±10°, ±20°, etc.), which can enable the image acquisition system to have up to an approximately 360° field of view (e.g., by having the cameras pointing in or facing different directions). In a fourth illustrative example, each camera can have an approximately 100° field of view, which can enable the image acquisition system to have a field of view between about 110° and 200°. However, the image acquisition system and/or cameras thereof can have any suitable field of view.

The position of the image acquisition system relative to the external system is preferably known (e.g., during calibration, during setup, dynamically determined during operation, etc.) and represented by one or more transformation matrices, but can alternatively be unknown.

Figure 8:
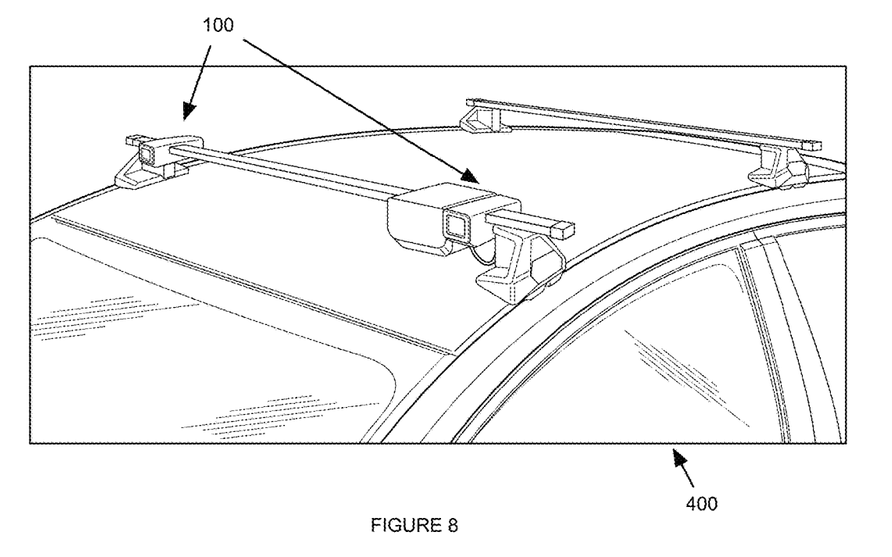
FIG. 8 is an example of an image acquisition system.

The system can include one or more image acquisition systems 100 (example shown in FIG. 8). In a first example, the system includes a single image acquisition system (e.g., a stereocamera pair, a single monocular camera, etc.). In a second example, the system includes multiple image acquisition systems (e.g., multiple stereocamera pairs, multiple monocular cameras, etc.). In the second example, the multiple image acquisition systems can be statically mounted (e.g., to the same mounting surface, same rail, same housing, etc.), actuatably mounted (e.g., via gimbals, arms, linkages, etc.), flexibly mounted, or otherwise related. The locations of the image acquisition systems relative to each other is preferably known (e.g., determined during calibration, setup, dynamically determined, etc.), unknown, or otherwise determined.

The sensor(s) 300 preferably function to acquire auxiliary data that can be used to detect a recalibration event. The sensor data can optionally be used to determine (and/or improve determination) of features (e.g., calibration features). The sensors are preferably collocated with the image acquisition system, which can function to generate a known sensor position. The sensors can be mounted to: the camera's PCB, the image acquisition system's housing, a mounting surface shared with the image acquisition system, mounted within a predetermined distance of the camera (e.g., 10 inches, 10 cm, etc.), and/or otherwise collocated with the camera(s). However, the sensor(s) can be otherwise mounted to the image acquisition system and/or separate from the image acquisition system (e.g., independently mounted to the external system). In a first example, each camera of the image acquisition system 100 includes an independent sensor set. In a second example, the image acquisition system 100 includes a sensor set, wherein the sensor set is shared between the cameras of the image acquisition system 100.

The sensors 300 are preferably inertial sensors (e.g., inertial measurement unit (IMU) sensors, accelerometers, gyroscopes, etc.) and/or wheel encoder(s), but can additionally or alternatively be altimeters, magnetometers, wheel encoders (e.g., rotary encoders such as absolute distance encoders, relative distance encoders, etc.), depth sensors (e.g., ultrasound, LIDAR, etc.), location sensors (e.g., GPS system, trilateration systems, etc.), acoustic sensors, (e.g., microphones, ultrasound, radar, etc.), temperature sensors (e.g., thermometers), pressure sensors, impact monitors, force sensors, cameras, and/or any suitable sensors. Examples of IMU sensors can be: mechanical (e.g., MEMS, gyrostat, hemispherical resonator, vibrating structure gyroscope or Coriolis vibrator, dynamically tuned gyroscope, etc.), gas-bearing, optical (e.g., ring laser gyroscope, fiber optic gyroscope, etc.), quantum (e.g., London moment gyroscope), crystal (e.g., piezoelectric), electromechanical, and/or other IMU technology(s). When more than one sensor is present, each sensor is preferably the same, but the sensor(s) can be different.

The computing system 200 functions to perform all or portions of the method. The computing system can additionally or alternatively function to process the image(s), determine correspondence maps between images, determine calibration parameters (e.g., calibration parameters associated with an image acquisition system), perform any other step(s) of the method and/or otherwise function. The computing system can be local (e.g., to the image acquisition system or one or more cameras thereof, to a sensor, to the external system, etc.), remote (e.g., cloud computing, server, etc.), and/or be distributed in any manner.

The computing system processes (e.g., correspondence matching, miscalibration detection, etc.) can be performed based on epipolar constraints between the image pair. The image pair can be concurrently sampled (e.g., by adjacent imaging systems) or sequentially sampled (e.g., by the same imaging system at different times). The epipolar constraints can function to limit a search space, identify an expected correspondence area, and/or be otherwise used. The epipolar constraints can be determined using the calibration parameters, an essential matrix, a fundamental matrix, the intrinsic parameters, the scene geometry, the extrinsic parameters, and/or any suitable information. The epipolar constraints can be an epipolar line, a horizontal scan line, and/or any suitable constraints. However, the computing system processes can be otherwise performed.

Figure 5:
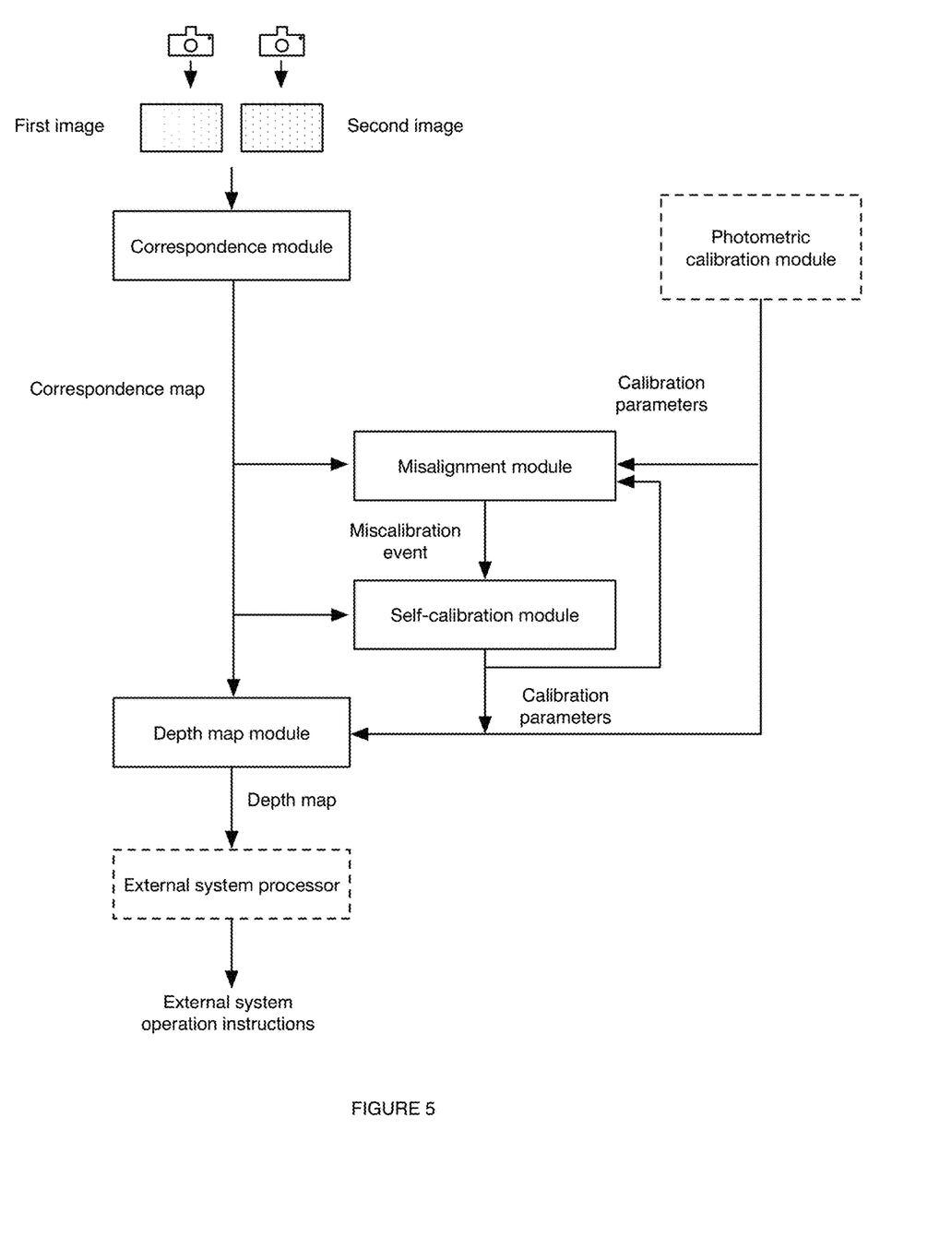
FIG. 5 is a schematic representation of an example of the method.
Figure 6:
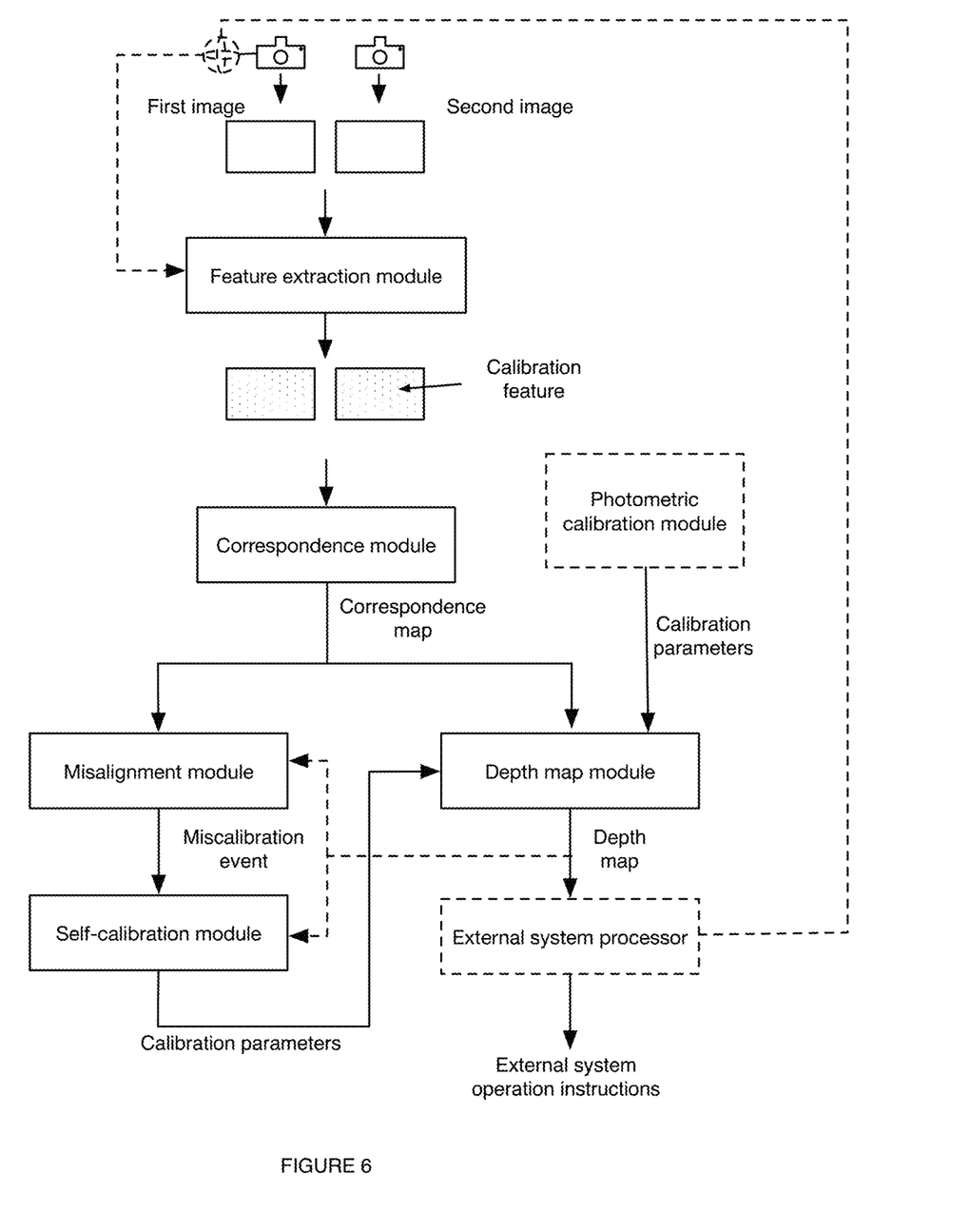
FIG. 6 is a schematic representation of an example of the method.

The computing system 200 can include one or more modules configured to perform all or portions of the method. For example, as shown in FIGS. 5 and 6, the computing system 200 can include: a calibration module (e.g., a photometric calibration module configured to perform S100, a self-calibration module configured to perform S700), a correspondence mapping module configured to perform S300, a depth map module configured to perform S400, a misalignment module configured to perform S600, an external system processor configured to perform S500, a combination thereof, and/or any other suitable set of modules. In this example, the calibration module, correspondence mapping module, depth map module, and misalignment module can be integrated into an image acquisition system computing system and the external system processor can be part of an external system computing system (e.g., external system ECU). However, the computing system can be distributed in any manner and/or include any suitable modules.

The external system 400 functions to traverse through a scene. The external system 400 can optionally function as a mounting surface for portions or all of the system. Examples of external systems 400 include vehicles (e.g., cars, trucks, locomotives, nautical vehicles, aerial vehicles, etc.), robots, a navigation system, and/or any other system. The external system 400 can be autonomous, a semi-autonomous, a manually-controlled, remotely controlled, and/or be otherwise controlled. The external system 400 can optionally include a localization system, a navigation system, a direction system, and/or any other suitable control system. The external system 400 can include the computing system of the system 10 or include a separate computing system.

4. Method.

As shown in FIG. 2, the method 20 can include acquiring images S200, determining a correspondence map S300, and determining a depth map S400. The method can optionally include calibrating an image acquisition system S100, operating an external system S500, detecting a recalibration event S600, and recalibrating the image acquisition system S700.

The method preferably functions to determine (e.g., calculate, estimate, generate, etc.) recalibrated parameters (e.g., intrinsic parameters, extrinsic parameters) of an image acquisition system online (e.g., during external system operation, etc.). The method is preferably performed in real- or near-real time, but can be performed offline, delayed, and/or with any suitable timing. The method and/or steps thereof are preferably performed iteratively during external system operation. The method and/or steps thereof can be performed at a predetermined frequency, at predetermined times, responsive to an input signal, in response to occurrence of a predetermined event, and/or with any suitable timing. However, the method can be performed once, responsive to a user input, and/or with any suitable timing. The method and/or steps thereof can be performed automatically, semi-automatically, manually, and/or in any manner.

The method can be particularly beneficial when a miscalibration event occurs during external system operation. A miscalibration event can be a single or recurring event that leads to an inaccurate, incorrect, and/or miscalibrated image acquisition system. Examples of miscalibration events include: temperature changes (e.g., thermal shock), vibrations, loose optics, loose mounting, humidity, weather (e.g., wind, hail, etc.), impacts (e.g., due to rocks, hail, debris, etc.), jerk, jounce, image acquisition system adjustment, and/or other events. Inaccurate calibration can be indicative of: lost or meaningless calibration, suboptimal calibration, suboptimal calibration for a portion of the image(s), suboptimal depth calculation using the calibration parameters, distorted images, physical shift in the relative camera poses, and/or otherwise indicate a calibration that is less than ideal or insufficient (e.g., low accuracy or precision of depth maps derived from the disparity maps and current calibration parameters) for a given application. The method generally performs better with a proper calibration, but can, in some situations, perform sufficiently (e.g., until self-calibration is performed, until a photometric calibration is performed, etc.) with an inaccurate calibration.

Figure 4:
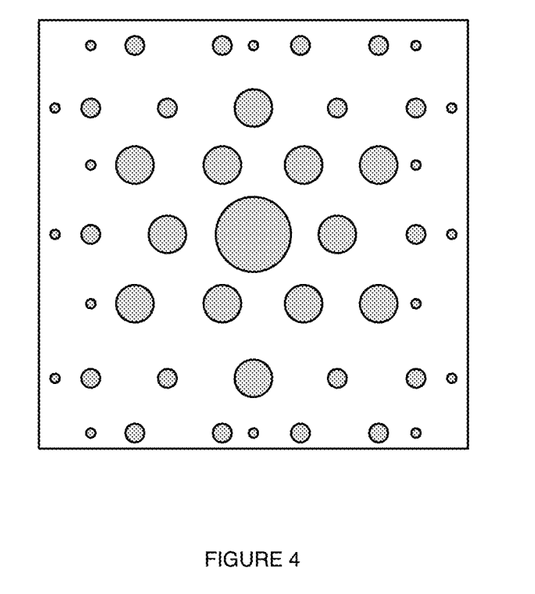
FIG. 4 is an exemplary calibration target.

Calibrating the image acquisition system S100 functions to determine the intrinsic and/or extrinsic parameters of the image acquisition system. S100 is preferably performed by a calibration module (e.g., a photometric module), but can be performed by any module of a computing system and/or by any suitable component. S100 can be performed once (e.g., upon image acquisition system manufacture; upon image acquisition system integration with the external system; per instance of the method or subset thereof such as at method start-up or the end of the method; per unit time such as day, week, month year, etc.; etc.), at a predetermined frequency (e.g., following a calibration schedule), randomly, and/or with any timing. S100 is preferably performed using a calibration target, where a plurality of images of the calibration target are acquired in different positions relative to the image acquisition system. The calibration target can include photometric features that are identical (e.g., same size, same shape, same spacing, etc.) or different (e.g., different sizes, different shape, different spacing, etc.) Example calibration targets include checkboards, churuco patterns, dot patterns (e.g., dots with a constant size, dots with varying size, equidistant dots, nonequidistant dots, example shown in FIG. 4, etc.), and/or any suitable calibration target(s). S100 preferably uses a calibration algorithm (e.g., autocalibration algorithm) to determine the intrinsic and/or extrinsic parameters, but can use machine learning, deep learning, and/or any suitable algorithm(s) to determine the calibration parameters.

In an illustrative example S100 can include acquiring a plurality of images of a calibration target (e.g., at known relative positions between the imaging system and the calibration target), extracting features (e.g., photometric features, shared features) from the plurality of images, determining calibration parameters (e.g., intrinsic parameters, extrinsic parameters) by fitting models from the plurality of images to the calibration target (e.g., using different calibration parameters). The optimization can be linear or nonlinear and can use any suitable calibration algorithm (such as Levenberg-Marquardt, gradient descent, newton's method, quasi-newton method, barrier methods, penalty methods, LaGrangian methods, etc.) to determine or evaluate the calibration parameters. In some variations, S100 can include segmenting one or more of the plurality of images. For example, the images can be segmented into foreground (e.g., photometric features within calibration target) and background. However, the images can be segmented into any suitable segment(s).

In a second illustrative example, S100 can include acquiring calibration images (e.g., of a calibration target), providing the images to a neural network, and using the neural network to determine calibration parameters. The neural network can be trained using a set of training images (e.g., a set of images associated with cameras with known calibration parameters) and/or in any suitable manner. In this example, the calibration parameters can be the weights of the neural network, can be derived from the neural network weights, an output of the neural network, and/or otherwise be determined from the neural network. In a variation of this example, a neural network can be used to determine calibration parameters using a neurocalibration method.

However, S100 can be performed in any manner.

Determining images S200 functions to receive a plurality of images of a scene proximal the image acquisition system. The images are preferably acquired by the image acquisition system, but can be retrieved from the computing system (e.g., an image database, memory, etc.) and/or otherwise be received. Each image is preferably associated with a time stamp and/or time window (e.g., the time of acquisition, the order of acquisition, etc.). The images are preferably acquired periodically (e.g., at a predetermined frequency, at predetermined times, etc.) during external system operation, but can be acquired at any suitable time(s).

The images can be grouped into calibration sets (e.g., analysis sets) where the calibration set can include sequential images (e.g., from the same camera), contemporaneous images (e.g., substantially concurrently sampled images from cameras with overlapping fields-of-view), both sequential and contemporaneous images, and/or any images. In an illustrative example, the calibration sets 112 can include image pairs from one or more consecutive or non-consecutive time stamps. However, the calibration sets can include any number of images and/or any suitable images. The calibration sets can be redefined for each timestep (e.g., be a sliding window applied to the image timeseries) or otherwise be defined. The images within an image pair can be sampled by a first and second camera (e.g., with overlapping fields-of-view; adjacent cameras; nonadjacent cameras; etc.), a single camera, or otherwise sampled. The images within the image pair at distinct timestamps are preferably sampled using the same cameras, but can be sampled with any camera(s).

The calibration preferably includes a pair of images, but can include image triplets, image quartets, image quintets, image sextets, image octets, and/or any number of images.

In an illustrative example, a camera can sample a timeseries of images. The calibration sets can be determined for each timestep, wherein each calibration set can include images sampled at a first and second timestep by the camera (e.g., images sampled at t and t−1 within the image timeseries). In a second illustrative example, a stereocamera pair can capture a timeseries of stereoimages, wherein the calibration sets for each timestep can include stereoimages from a timestep.

S200 can optionally include receiving auxiliary sensor data S150, which can function to provide auxiliary data that can be used to process the images (e.g., stabilize the images), validate correspondence vectors, be indicative of component motion, be indicative of a miscalibration event, and/or otherwise function. The auxiliary data (e.g., IMU data) can be acquired at the same time as the images (e.g., concurrently, contemporaneously), more frequently than the images, less frequently than the images, and/or at any suitable frequency. The auxiliary sensor data is preferably associated with an image acquisition system, more preferably an image sensor (e.g., the image sensor that the sensor shares a circuit board, clock, mounting surface, housing, etc. with; image sensor that is otherwise associated with auxiliary sensor), but can alternatively be associated with: an image, a set of images, multiple image sensors, the system as a whole, the external system, and/or be associated with any other suitable data or component. The auxiliary data can be received from a sensor, from a sensing system, a computing system (e.g., a database), and/or be received from any system. The auxiliary sensor data can be synchronized between sensors and/or be unsynchronized.

S200 can optionally include processing the images, which functions to modify (e.g., translate, rotate, etc.) one or more images to ensure that the images are coplanar and aligned to have parallel epipolar lines, generate a rectified image set (e.g., rectified image pair), modify one or more images (e.g., remove bad pixels, remove blur, change brightness and/or contrast, etc.) and/or perform any suitable function. Processing the images can include rectifying the image, scaling at least one of the images (e.g., scaling the pixel size, scaling the full image, to match another image size, etc.), converting the images (e.g., from color images to grayscale, compress the image file, interpolating between pixels of the image(s) etc.), and/or can include any suitable steps. In a first specific example, the images (e.g., of the calibration set) can be rectified by transforming the images using the essential and/or fundamental matrix (e.g., determined in S100, determined in S700). In a second specific example, rectifying the images can include determining sparse correspondences, determining (e.g., retrieving, estimating) a fundamental matrix, and computing projective transformations to map the epipoles of the image pair to infinity. In this specific example, rectifying the images can generate new values for the effective focal length of the image acquisition system and the effective distance between the centers of projection. However, rectifying the images can be performed in any suitable manner.

Determining a correspondence map between images S300 functions to identify matching features within the images of an image set (e.g., image pair, odometry set), where the match is indicated by a correspondence vector associated with each feature. The matched features can depict the same points in the scene, or represent any other suitable physical feature. The correspondence vectors for features of an image cooperatively form a correspondence map. The correspondence map can be a disparity map (e.g., be determined between concurrent images, indicative of binocular parallax), an optic flow map (e.g., be determined between consecutive images acquired by a common camera, indicative of motion parallax), and/or include any suitable correspondence map. The correspondence map is preferably dense or semi-dense (e.g., includes valid correspondence vectors for more than a threshold proportion of pixels, such as >10%, >25%, >50%, >75%, >90%, and/or ranges therebetween), but can be sparse and/or have any suitable density. The features can include: pixels, superpixels, blocks of pixels, pixel sets, structures (e.g., edges, corners, objects, etc.), and/or any information within the images. The features can be nondistinctive or distinctive (e.g., locally or globally unique). Correspondence map determination can be facilitated via feature tracking, using previously determined correspondence maps (e.g., wherein correspondences in subsequent correspondence maps are seeded using prior correspondence maps), and/or otherwise be facilitated. The correspondence map is preferably determined using a correspondence map module, but can be performed by any suitable module (e.g., of a computing system) and/or by any suitable component.

Correspondence maps are preferably determined for each pair of images in a calibration set, but can alternatively be determined for a subset thereof.

S300 is preferably iteratively performed at every timestep (e.g., each time a new concurrent image set is sampled or received), but can be performed at a predetermined frequency, in response to a trigger (e.g., request for recalibration from the external system), and/or at any other suitable time.

In a first variant, determining the correspondence map S300 can include: determining feature representations for features in each image of an analysis set, determining a set of correspondence vectors, determining a cost associated with each correspondence vector (based on the pixel representations of the pixels identified by the correspondence vector), and updating the correspondence map based on the cost. Determining the correspondence map can be iterative (e.g., until a condition is met, such as a predetermined number of iterations, a predetermined correspondence map quality, etc.) or single-shot. Determining the correspondence map can optionally include removing errant pixels (e.g., outliers, vectors that are inconsistent with the auxiliary data, etc.). The feature representations can be bit strings, hashes, encodings of the feature's neighborhood, and/or other representations.

In an example of the first variant, determining the correspondence map S200 can include acquiring two images. Each pixel from each image can be converted to a bit string. The bit string (e.g., pixel hash) for an analysis pixel can be determined by comparing the intensity of the analysis pixel to each of a set of bit string pixels, wherein the bit string pixels are determined according to a low discrepancy sequence and collectively span a pixel block associated with (e.g., adjacent to, surrounding, etc.) the analysis pixel. The correspondence map for the first image can be initialized, for example by determining a correspondence vector for each pixel or using a correspondence vector from a prior timestep. The correspondence vector for each pixel can be determined, for example, according to a low discrepancy sequence (such as a Halton sequence), and can be assigned to each pixel along a correspondence vector assignment path. The pixels from the first image can then be compared to the corresponding pixels from the second image (e.g., by determining a Hamming distance between the bit string associated with each pixel), wherein the pixels in the second image are specified by the respective correspondence vectors. The cost (e.g., determined from the comparison) for each of the correspondence vectors can be stored. The correspondence map can be updated by generating new correspondence vector estimates (e.g., candidate correspondence vectors) for each of the pixels from the image based on the correspondence vectors for adjacent pixels neighboring the respective pixel. The pixel comparison and correspondence map updating can be iteratively performed until a stop condition is met (e.g., average or highest cost falls below a threshold, predetermined number of iterations, etc.). A second correspondence map can optionally be determined for pixels of the second image (e.g., compared to the pixels of the first image) in a similar manner to first correspondence map determination. The second correspondence map can be determined concurrently, serially, or in any other suitable order relative to determination of the first correspondence map. If the second correspondence map matches the first correspondence map (e.g., based on a validation criterion), then the matching correspondence map (or portions thereof) can be stored, and/or used to determine one or more outputs. Determining the correspondence map can optionally include refining the correspondence map to generate a sub-pixel accurate correspondence map (e.g., using a neural network, secondary pixel representation, etc.). Determining the correspondence map can optionally include detecting and/or removing false correspondences (e.g., correspondences that do not match between images of the analysis set, correspondences that are inconsistent with inertial sensor measurements, etc.) from the correspondence map.

In a second variant, determining the correspondence map(s) can be performed according to the method or steps thereof as disclosed in U.S. application Ser. No. 16/936,269 filed 22 Jul. 2020 entitled "PASSIVE STEREO DEPTH SENSING" and/or U.S. application Ser. No. 17/104,898 filed 25 Nov. 2020 entitled "SYSTEM AND METHOD FOR CORRESPONDENCE MAP DETERMINATION" each of which is incorporated in its entirety by this reference.

In a third variant, the correspondence map and/or features to be matched between the images can be determined using Harris algorithm, using machine learning, features from accelerated segment test (FAST), using oriented FAST and rotated binary robust independent elementary features (BRIEF) (ORB), speeded-up robust features (SURF), scale invariant feature transform (SIFT), binary robust invariant scalable keypoints (BRISK), and/or other feature detection algorithms; and/or in any manner.

However, the correspondence maps can be determined in any manner.

S300 can optionally include removing false and/or misaligned (e.g., as determined in S600) correspondences from the correspondence map, which can function to improve the accuracy or precision of the determined depth map. The correspondences are preferably removed before determining the depth map, but can be removed simultaneously with and/or after determining the depth map. Misaligned (e.g., miscalibrated) correspondence can be correspondences where the actual correspondences are not in an expected location. For example, an expected correspondence can be determined from a feature and an epipolar constraint. In this example, a misaligned correspondence can refer to an actual correspondence that is detected off a horizontal (or epipolar) scan line. In a second example, misaligned correspondences can refer to correspondence vectors between complimentary correspondence maps (e.g., a correspondence map from a first image to a second image and a second correspondence map from the second image to the first image) that do not match. False correspondences can refer to correspondences where the actual correspondence does not agree (e.g., differs by greater than a threshold amount) with an expected correspondence (e.g., derived from auxiliary sensor data). However, false correspondences can be determined as misaligned features (e.g., as described in S600) and/or false or misaligned correspondences can be otherwise determined or defined.

Figure 7:
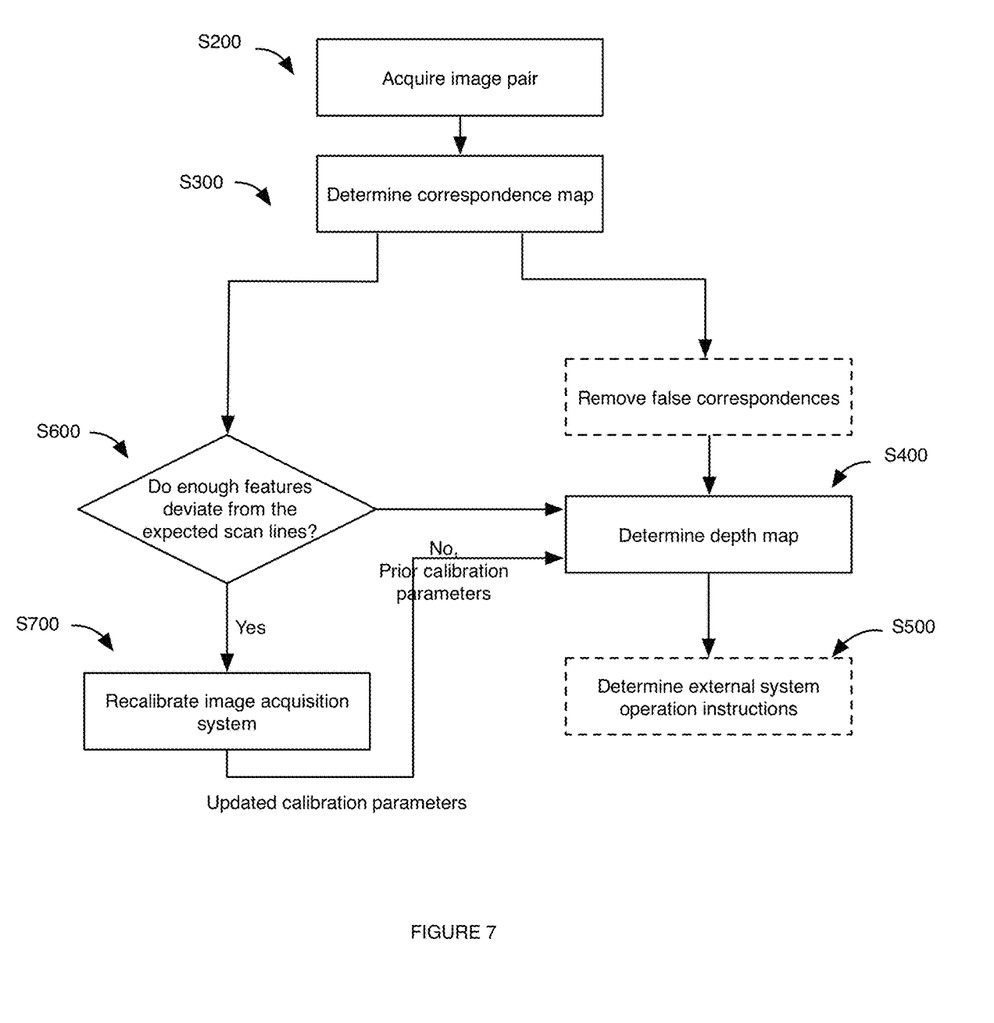
FIG. 7 is a flow representation of an example of the method.
Figure 9:
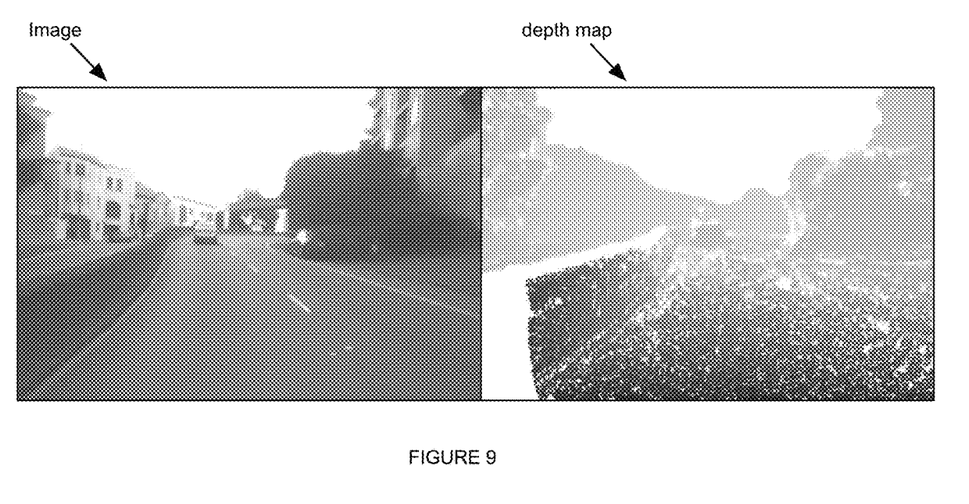
FIG. 9 is an example of an image captured by the image acquisition system and a corresponding depth map.

Determining a depth map S400 preferably functions to determine a distance between the image acquisition system and objects in the scene represented in the images. S400 is preferably performed by a depth map module, but can be performed by any module and/or any component. S400 is preferably iteratively performed at every timestep (e.g., each time a new concurrent image set is sampled or received), but can be performed at a predetermined frequency, in response to a trigger (e.g., request for recalibration from the external system), and/or at any other suitable time. The depth map can be determined using the matched features (e.g., as represented in the correspondence map), a subset of the matched features (e.g., matched features remaining after removing false features, removing misaligned features), the calibration parameters (e.g., as determined in S100, from a previous iteration of the method, as determined in S700, as shown for example in FIG. 7, etc.), the auxiliary data, and/or using any suitable data. For example, as shown in FIG. 9, the matched features from a correspondence map (e.g., the associated correspondence vectors) can be used to calculate depth based on the associated parallax and calibration parameters (e.g., intrinsic calibration parameters, extrinsic calibration parameters).

In variants, a depth map can be determined from the disparity map (e.g., using calibration parameters relating the contemporaneous or concurrent images), a depth map can be determined from the optic flow map (e.g., using calibration parameters relating the sequential images), and/or a depth map can be otherwise determined.

S400 can include generating a denser depth map which functions to fill in missing information (e.g., gaps) in a depth map. The gaps are preferably filled using a neural network (e.g., a deep neural network, a convolutional neural network, a nonlocal neural network, a recursive neural network, etc.), but can additionally or alternatively use a model, user input (e.g., user segmentation), and/or otherwise fill gaps in the depth map. In a specific example, a depth map and corresponding image can be provided to the neural network, where the neural network can output a denser depth map and optionally a semantic segmentation of the image.

Operating the external system S500 functions to traverse a scene using the external system. The external system is preferably operated based on (and/or external operation system instructions can be determined based on) information from the depth map and/or correspondence map, but can be operated independent of the depth map or correspondence maps. For example, external system operation instructions can be generated based on a depth map, a distance between the external system and one or more objects in the scene (e.g., as determined in the depth map), and/or based on any suitable data or information. The external system can be operated following the external system operation instructions. Examples of external system operation instructions include changing an external system direction, adjusting an external system heading, adjusting an external system speed, external system localization, navigation, changing a vehicle lane, and/or any suitable operation instructions. However, the external system can be operated in any manner.

When a recalibration event is determined (e.g., a previous calibration is inaccurate, as described in S600, etc.), the external system operation instructions can: stop being generated, be modified based on the recalibration event, be updated (e.g., new external system operation instructions can be generated), include transmitting a notification (e.g., a flag; indicating a recalibration event) to an operator of the external system, and/or include any suitable response.

Detecting a recalibration event S600 functions to determine when calibration parameters (e.g., intrinsic calibration parameters, extrinsic calibration parameters) should be redetermined (e.g., when the imaging system should be recalibrated). A recalibration event can be associated with a need to recalibrate the image acquisition system (e.g., according to S100 or S700). A recalibration event can be associated with or independent of a miscalibration event. S600 is preferably performed online (e.g., during external system operation) but can be performed offline and/or at any suitable time. S600 is preferably performed by a miscalibration module, but can be performed by any suitable module and/or any suitable component.

S600 can be performed: after a potential miscalibration event is detected (e.g., based on auxiliary data), at a predetermined frequency (e.g., according to a recalibration event schedule), randomly, responsive to a user input (e.g., a request for a recalibration check), after a predetermined time of external system operation, for each image that is acquired, and/or with any timing. S600 can be performed for every time stamp and/or a subset of timestamps.

The recalibration event can be determined based on calibration features, sparsified features, all features or subsets thereof (e.g., from a correspondence map), a comparison between current features and previous features (e.g., a comparison of feature positions in a correspondence map at time t with feature positions in a correspondence map at time t−1; feature tracking; etc.), and/or using any suitable features.

In variants where calibration features are used, candidate calibration features can be selected from: correspondence maps (e.g., for the current timestamp, prior timestamp), features used to determine the correspondence maps, calibration features from a prior timestamp, or any other suitable feature(s). Calibration features (and/or candidate calibration features) are preferably determined using a feature extraction module, but can be determined using any suitable module of a computing system and/or any suitable system. Candidate features can be included in the calibration feature set: randomly, according to a deterministic method, using a low discrepancy sequence, when the feature satisfies a calibration feature criterion, based on feature tracking (e.g., between time stamps), using machine learning to select or identify features, based on a quality of the candidate features (e.g., matching cost value), based on an object that the feature is associated with or represents in the image, be predetermined pixels, be false correspondences (e.g., false correspondences consistent with inertial measurements but inconsistent across correspondence maps, etc.), be true correspondences (e.g., consistent with inertial measurements, consistent with epipolar constraints, consistent across a calibration image set, features with depths above a threshold accuracy, etc.), and/or included in any manner. Alternatively, candidate features are not selected, wherein S600 can use all candidate features from the correspondence map. Examples of calibration feature criterion include: cyclic mappings, diagonal mappings, agreement between multiple correspondence vectors (between different image pairs), a calculated correspondence vector matching a previously determined correspondence vector, and/or any suitable criterion. However, calibration features can be otherwise selected.

At least one object associated with a calibration feature preferably has a known size (e.g., object size known with a precision of ±1 mm, ±1 cm, ±1 m, etc.), which can be beneficial for correcting one or more calibration parameters. Example of objects (or object classes) that features can represent with known sizes include: street signs, characters on street signs, manhole covers, billboards, road markings, roads, distance between telephone poles, distance between known immobile objects (e.g., determined based on the imaging system geolocation), and/or other objects in scenes. The objects with known size can be identified using semantic segmentation (e.g., of one or more images), instance segmentation, user input, and/or otherwise be identified. However, the object size can be unknown, and/or the scale of an object can be otherwise inferred or determined.

In some variants, the motion (e.g., distance traveled, change in pose, etc.) of the image acquisition system between successive images can be determined. The motion can be determined based on: auxiliary data, depth maps derived from successive images (e.g., depth maps calculated from optic flow maps), and/or otherwise be determined.

The calibration features can optionally be sparsified, which can be beneficial to speed up recalibration, reduce memory usage, and/or otherwise be beneficial. The calibration features can be sparsified when the number of calibration features exceeds a threshold number of features, when a threshold processing power is exceeded (or predicted to be exceeded), based on a threshold computational time estimate, and/or in other conditions. The calibration features can be sparsified based on a sparsification criterion. The sparsification criterion can include an object class (e.g., wherein features associated with predetermined object classes are included or excluded from the sparsified feature set), feature motion, holonomic constraints, consistency checks (e.g., cyclic consistency checks), outlier rejection (e.g., using RANSAC), and/or any suitable criterion. In a specific example, outliers in the candidate features can be identified using RANSAC and the outliers can be excluded from the calibration features. One or more sparsification criteria can be used. Multiple sparsification methods can be applied serially, in parallel, and/or in any order.

A recalibration event can be determined based on: an unexpected feature position, an unexpected correspondence vector, a threshold number of features at unexpected locations (e.g., greater than 1; 2; 3; 5; 10; 20; 30; 50; 100; 200; 300; 500; 1000; 2000; 3000; 5000; 10,000; 20,000; 50,000; 100,000; 200,000; 500,000; 1,000,000; etc. features), a threshold percentage (or proportion) of features at unexpected locations (e.g., greater than about 0.1%, 0.5%, 1%, 2%, 5%, 10%, 20%, 30%, 40%, 50%, 60%, 70%, 80%, 90%, and/or values therebetween), a threshold number of unexpected correspondence vectors (e.g., greater than 1; 2; 3; 5; 10; 20; 30; 50; 100; 200; 300; 500; 1000; 2000; 3000; 5000; 10,000; 20,000; 50,000; 100,000; 200,000; 500,000; 1,000,000; etc.), sustained unexpected feature locations (e.g., a threshold number of features at unexpected locations for a threshold amount of time, for a threshold number of frames, etc.), a quality of an image, a time threshold (e.g., a predetermined amount of time has elapsed since the last recalibration event, a predetermined amount of time has elapsed since the calibration was checked, etc.), auxiliary data satisfying an auxiliary condition (e.g., an acceleration exceeding a predetermined threshold, an impact detected, a force exceeding a threshold, etc.), a distance threshold (e.g., a distance determined based on the calibration images differs from a distance determined from the sensors by a distance threshold), and/or any suitable information.

Figure 3:
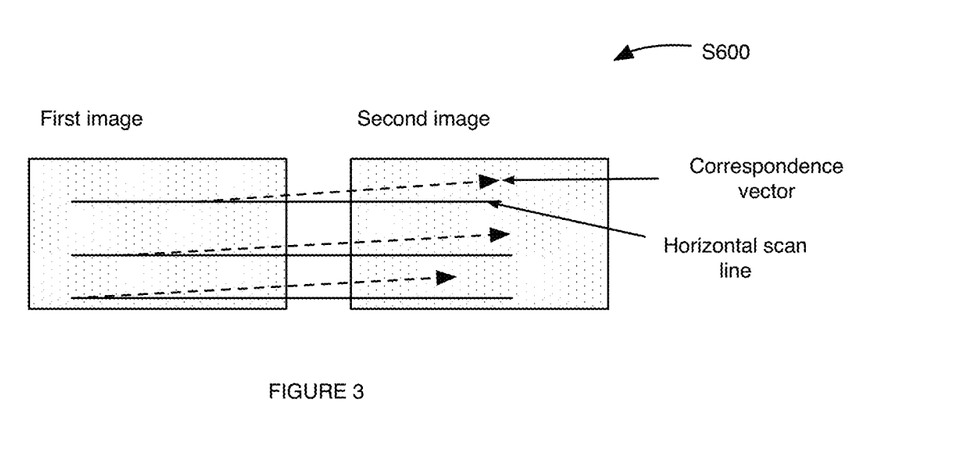
FIG. 3 is an exemplary schematic representation of detecting a recalibration event.

In a first variant, a recalibration event can be identified when a misaligned feature correspondence is detected. A misaligned feature correspondence can refer to a feature correspondence that is inconsistent with an epipolar constraint, where the epipolar constraint is determined based on the current calibration parameters. In an illustrative example, a misaligned feature can refer to a feature that is detected off an expected epipolar line (e.g., of a rectified image, determined using the current calibration). The expected epipolar line can be an epipolar line, a previous epipolar line (e.g., for an earlier time stamp), an epipolar line predicted based on auxiliary data (e.g., an IMU dataset), and/or any suitable epipolar line. In a second illustrative example as shown in FIG. 3, a misaligned feature can be detected when a correspondence vector is off an expected epipolar line (e.g., a horizontal scan line).

In a second variant, a recalibration event can be identified when a feature is misaligned by at least a threshold distance from the expected feature location, as determined from the epipolar constraint. In a first illustrative example of the second variant, a recalibration event can be identified when a feature correspondence is detected a threshold number of pixel rows away from an expected number of pixel rows. In a second illustrative example, a recalibration event can be identified when a vertical component of a correspondence vector exceeds a threshold value.

In a third variant, a recalibration event can be detected based on a quality of one or more calibration images. The quality can refer to distortion in the image, aberrations in the image, and/or any suitable image quality. The quality can be determined using a neural network (e.g., convolutional neural network, deep neural network, recursive neural network, etc.), based on user input, based on an image scoring algorithm, and/or in any manner. When a quality passes (e.g., is greater than or equal to, is less than or equal to, etc.) a threshold value, a recalibration event can be triggered.

In a fourth variant, a recalibration event can be detected based on a depth map generated using the current calibration. In a first specific example of this variant, the size of feature determined from the depth map can be compared to the (known) size of the object associated with the feature (e.g., as determined based on a feature class). When a difference between the feature size and the known size exceeds a threshold, a recalibration event can be triggered. In a second specific example of this variant, a depth map from a current time point (e.g., time t) can be compared to a depth map from a previous time point (e.g., time t−1). When an object (or threshold number of objects) appears to change anomalously (e.g., size of an object grows or shrinks by greater than a threshold amount, distance between the image acquisition system and the object changes by a threshold amount, etc.), a recalibration event (e.g., to recalibrate the intrinsic matrix and/or extrinsic matrix) can be triggered. However, a recalibration event can be determined based on the depth map in any manner.

In a fifth variant, a recalibration event can be detected based on a comparison between a distance traveled as determined according to auxiliary data (e.g., linear distance traveled measured using a wheel encoder) to a distance traveled as determined using (stereo) visual odometry (e.g., according to methods and/or steps thereof as disclosed in U.S. application Ser. No. 17/154,986 filed on 21 Jan. 2021 titled "SYSTEM AND METHOD FOR EGOMOTION ESTIMATION" incorporated in its entirety by this reference). When a difference between the distance determined using auxiliary data and the visual odometry exceeds a threshold, a recalibration event can be triggered and/or an issue with the sensor (e.g., the sensor needs to be recalibrated, the sensor is broken, etc.) can be identified.

In a sixth variant, one or more of the preceding variants can be combined to determine a recalibration event. In a first example, a recalibration event score can be calculated. The recalibration event score can be calculated for: an image, a timestamp, a feature, and/or any other suitable data structure. The recalibration event score can be calculated from a number of features detected of the epipolar line, a distance that features are detected off the epipolar line, a difference between an expected feature location and actual feature location, an image quality, a depth map (or feature size) difference, an auxiliary dataset, a number of frames (e.g., consecutive frames or aggregate frames) in which a given feature is misaligned, and/or any suitable inputs. When the recalibration event score exceeds a threshold, a recalibration event can be triggered. In a second example, voting based on the results from two or more recalibration event determination methods can be used to detect a recalibration event. However, two or more methods for detecting a recalibration event can be combined in any manner.

S600 can optionally include identifying which calibration parameter(s) are miscalibrated, which can function to isolate or identify what calibration parameters need to be recalibrated and/or constrain the recalibration search. The miscalibrated parameter(s) can be identified based on redundant information (e.g., correspondence maps and/or depth map generated using a third image), auxiliary data, depth map error, a time series of calibration image sets, a change in a calibration feature over time, calibration feature tracking, image quality, the type of recalibration event that was detected, and/or based on any suitable information. The miscalibrated parameters can be identified using a neural network (e.g., trained to identify miscalibrated parameter(s)), machine learning, an image model, and/or any suitable method can be used. In an example, when a recalibration event is triggered based on a first and second image, a first correspondence map between the first image and a third image and a second correspondence map between the second and third image can be determined (and/or compared). The third image can be associated with a different camera (e.g., a third camera), a different time point (e.g., a consecutive or nonconsecutive frame of a timeseries of images from a common camera), and/or any suitable image can be used. The first and second correspondence maps can be used to identify which calibration parameters are miscalibrated. For example, a miscalibration detected in the first correspondence map but not in the second correspondence map can suggest that a property of the camera associated with the first image can be miscalibrated. However, miscalibrated calibration parameters can be otherwise identified.

In a first illustrative example, detecting a feature correspondence on a different epipolar line (e.g., on a different horizontal scan line) than expected can indicate that one or more extrinsic parameters need to be recalibrated. In a second illustrative example, detecting a different depth or object size between successive frames can indicate that one or more intrinsic parameters need to be recalibrated.

S600 can optionally include determining a cause of the recalibration event (e.g., the miscalibration event), which functions to determine the source of the miscalibration. The cause can be determined using auxiliary data (e.g., IMU data), images from immediately prior to the recalibration event trigger, images acquired between a previous recalibration event check and the current recalibration event check, and/or otherwise be performed.

Recalibrating the image acquisition system S700 functions to determine updated calibration parameters (e.g., intrinsic parameters, extrinsic parameters) for the image acquisition system. S700 can be performed when a recalibration event is determined (e.g., in S600, as shown for example in FIG. 7, etc.), at a predetermined frequency, at predetermined times (e.g., after the external system has operated for a predetermined amount of time, at external system start-up, at external system shutdown, etc.), randomly, based on a recalibration request, when a calibration score achieves a threshold calibration score, when an image quality (e.g., associated with an image of the calibration set) achieves a threshold image quality, for each image that is acquired, and/or at any suitable times. S700 can be performed automatically, semi-automatically, and/or manually (e.g., in response to a user input). S700 is preferably performed using a self-calibration module, but can be performed by any suitable module (of a computing system) and/or by any component. S700 is preferably performed contemporaneously with external system operation (e.g., online calibration), but can be performed offline. Subsequent iterations of the method can use the new calibration determined in S700, or use a prior calibration.

Although it is preferable to update or recalibrate all calibration parameters, for many applications, only a subset of calibration parameters can be determined or updated in real-time during external system operation. For example, a subset of calibration parameters can be determined to need recalibration (e.g., calibration parameters identified in S600). In this example, S700 can include constraining (e.g., fixing) a set of calibration parameters and redetermining a second set of calibration parameters (e.g., calibration parameters that are identified as needing to be updated, calibration parameters that typically change, calibration parameters that have historically needed to be recalibrated, etc.). However, all calibration parameters or any subset of calibration parameters can be updated.

The updated calibration parameters are preferably determined using a solver, but can be otherwise determined. The solver can be a self-calibration solver, an auto-calibration solver, and/or any suitable solver. Examples of solvers include: Kalman filter, MD simulations, Monte Carlo simulations, particle filters, unscented Kalman filters, extended Kalman filters, nonlinear filters, bundle adjustment, volumetric flow-based neural networks, end to end solvers, direct linear transformation (DLT) method, Zhang's method, Tsai's method, Selby's method, and/or any suitable solver or method. The same solver can be used to determine every calibration parameter (e.g., every calibration parameter that is to be updated) and/or different solvers can be used to determine different calibration parameters (or different sets of calibration parameters). The solver can be the same as or different from the solver used to determine the initial calibration in S100.

Inputs to the solver can include: features (e.g., calibration features), a subset of the features (e.g., randomly selected, features selected using a deterministic method, features selected by a low discrepancy sequence, etc.), a correspondence map (e.g., between images of the calibration set), the depth map, auxiliary data (e.g., IMU data), current calibration parameters, a feature track (e.g., associated with a feature), one or more images from the calibration set, external system kinematics (e.g., linear or radial velocity, acceleration, jerk, or jounce; yaw, roll, pitch, etc.), image acquisition system kinematics (e.g., system motion), system component kinematics, prior calibration parameters (e.g., prior intrinsic parameters, prior extrinsic parameters, prior essential matrix, prior set of calibration parameters, etc.), and/or any suitable inputs. Outputs from the solver can include: updated calibration parameters (e.g., an updated essential matrix, an updated fundamental matrix, updated extrinsic parameters, updated intrinsic parameters, an updated set of calibration parameters, etc.), the pose of the system and/or a subcomponent thereof (e.g., of the image acquisition system, of the external system, of a sensor, etc.), an error in the updated calibration parameters, an error in the pose, a covariance (e.g., between calibration parameters, between the calibration parameters and the pose, etc.), and/or any suitable information.

In a first variant, recalibrating the imaging system can include: identifying known objects associated with the identified features (e.g., aligned features, misaligned features) using semantic segmentation, determining (e.g., retrieving) the object size (e.g., based on the object label or object semantics), and determining updated calibration parameters based on the known object size and the feature correspondences across the analysis images.

In a second variant, recalibrating the imaging system can include determining feature depths for matched features within the analysis images, and updating the calibration parameters based on the feature depths from the aligned features. In a first embodiment, aligned features (e.g., features consistent with the prior respective epipolar constraints) used for recalibration, wherein the aligned feature depths are determined using the prior calibration. In a second embodiment, a set of matched, true features (e.g., feature consistent with inertial measurements, features that are mutually matched in complimentary correspondence maps, etc.) are used for recalibration, wherein the feature depths are determined from a secondary source (e.g., optic flow, calibrated auxiliary depth sensor, etc.). In the second embodiment, all or a subset of the matched, true features can be used. When a subset is used, the subset of features can satisfy a predetermined distribution across the image frame, satisfy a predetermined distribution of depths, and/or satisfy any other suitable condition.

In a third variant, recalibrating the imaging system can include: determining feature depths, and recalibrating the imaging system using the feature depths In a specific example, dense depth maps between stereo-images and dense depth maps between successive images (and/or the associated disparity and optic flow maps) can be provided to a calibration module (e.g., hosting or performing the calculations associated with the solver) which can output new calibrations that are used in subsequent iterations of the method (e.g., replacing the current calibration parameters with updated calibration parameters). In this specific example, the new calibration can be determined based on: on feature correspondences between the images (e.g., determined from the dense correspondence map), feature depths (e.g., determined from the dense correspondence map and the current or prior calibration; be a prior depth of the same feature from a prior timestamp, modified by a traversed distance determined from an odometry system; be determined by an auxiliary depth system; etc.), and/or any other suitable information. The features used for recalibration are preferably not misaligned (e.g., are consistent with their respective epipolar constraints), and are preferably different from those used to determine that recalibration is needed (e.g., wherein the same correspondence map includes both misaligned features and features compliant with the respective epipolar constraint). However, the features used for recalibration can alternatively be or include the misaligned features.

Alternatively, in this specific example, the new calibration can be determined based on the feature correspondences between the images (e.g., the aligned features) and a known size of the feature (e.g., retrieved from a database). However, the new calibration can be otherwise determined.

However, the calibration parameters can be otherwise determined.

The calibration parameters (e.g., current calibration parameters, updated calibration parameters, individual parameters thereof) can be associated with a calibration score (e.g., calibration metric), which can function to evaluate a quality of the calibration parameters. The calibration score can be determined based on a comparison between an estimated size of an object associated with features (e.g., determined using depth map generated with the calibration parameters) and known or predicted size of the objects, an image quality (e.g., measure of how much distortion or other aberrations are detected in images with the calibration parameters), a difference between the updated calibration parameters and previous calibration parameters (e.g., a factory calibration, initial calibration at start of the method, immediately prior calibration, a calibration from S100, a calibration from a previous iteration of S700, etc.), an amount of time size the last calibration, and/or other data or information. The calibration score can be used to determine whether or not to update the calibration parameters, whether or not to determine (e.g., calculate) new calibration parameters, whether or not to use previous calibration parameters, and/or otherwise be used. In a first example, when a calibration score falls below a threshold value, updated calibration parameters can be determined. In a second example, when a calibration score associated with an updated calibration exceeds a calibration score associated with an existing calibration, the updated calibration can replace the existing calibration. However, a calibration score can be otherwise generated or used.

In some variations of S700, particularly but not exclusively when a source of the miscalibration is known, the image acquisition system can be modified (e.g., a camera position can be changed, a camera can be reoriented, etc.) to update the calibration parameters (e.g., to return the calibration parameters to a prior state).

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system comprising:
   correspondence mapping module that determines a dense correspondence map comprising feature correspondences between images sampled by an image acquisition system
   a depth map module that determines a depth map based on the dense correspondence map and an epipolar constraint;
   a miscalibration module that detects image acquisition system miscalibration when feature correspondences within the dense correspondence map deviate from the epipolar constraint; and
   a recalibration module that recalibrates the image acquisition system based on the dense correspondence map.

2. The system of claim 1, wherein the images are sampled by a first and second camera with overlapping fields of view.

3. The system of claim 1, wherein the features are nondistinctive.

4. The system of claim 1, further comprising a host system mounting the image acquisition system, wherein the image acquisition system is recalibrated based on images sampled during motion of the host system.

5. The system of claim 4, wherein the host system comprises a vehicle.

6. The system of claim 4, wherein the host system is operated based on the depth map.

7. The system of claim 1, wherein the miscalibration is detected when more than a threshold proportion of feature correspondences deviate from the epipolar constraint.

8. The system of claim 1, wherein the features are pixels, wherein the correspondence map comprises feature correspondences for more than a threshold proportion of pixels in each image.

9. The system of claim 8, wherein the threshold proportion is at least 50%.

10. The system of claim 1, wherein the feature correspondences within the correspondence map are determined without using the epipolar constraint.

11. The system of claim 1, wherein determining the correspondence map comprises:
    determining a feature hash for each feature in each image; and
    for each feature in an image, iteratively searching for a corresponding feature in another image, based on a cost value determined between the respective feature hashes.

12. A system comprising:
    a host system;
    an image acquisition system, mounted to the host system, that captures images; and
    a processing system coupled to the image acquisition system, configured to:
      determine a correspondence map matching features between the images;
      determine a depth map based on the correspondence map and an epipolar constraint;
      detect miscalibration of the image acquisition system based on the correspondence map and the epipolar constraint; and
      recalibrate the image acquisition system during operation of the host system.

13. The system of claim 12, wherein the features comprise nondistinctive features.

14. The system of claim 12, wherein the correspondence map is determined independent of the epipolar constraint.

15. The system of claim 12, wherein the correspondence map is a dense correspondence map, comprising matches for more than a majority of candidate features.

16. The system of claim 12, wherein the depth map is a dense depth map, comprising a depth value for more than a majority of pixels within an image.

17. The system of claim 12, wherein the image acquisition system is recalibrated during motion of the host system.

18. The system of claim 12, wherein recalibrating the image acquisition system comprises determining an updated epipolar constraint based on the correspondence map.

19. The system of claim 12, wherein the miscalibration is detected when matching features within the correspondence map deviate from the epipolar constraint.

20. The system of claim 19, wherein the epipolar constraint comprises an epipolar line, wherein the miscalibration is detected when a matching feature deviates from the epipolar line by at least a threshold distance.

* * * * *